United States Patent
Afful

(12) 
(10) Patent No.: US 6,695,554 B2
(45) Date of Patent: Feb. 24, 2004

(54) METHOD FOR VERTICALLY RESTRAINING AIRCARGO PALLETS WITHIN AN AIRCRAFT

(76) Inventor: Matt Afful, 5809 - 152nd St. SW., Edmonds, WA (US) 98026

( * ) Notice: Subject to any disclaimer, the term of this patent is extended or adjusted under 35 U.S.C. 154(b) by 0 days.

(21) Appl. No.: 10/267,398

(22) Filed: Oct. 8, 2002

(65) Prior Publication Data

US 2003/0031523 A1 Feb. 13, 2003

Related U.S. Application Data

(62) Division of application No. 09/737,694, filed on Dec. 18, 2000, now Pat. No. 6,485,239.

(51) Int. Cl.$^7$ .................................................. B60P 7/08
(52) U.S. Cl. .............................. 410/80; 410/77; 410/46; 410/92
(58) Field of Search .............................. 410/77, 78, 79, 410/80, 86, 69, 46, 92; 414/536; 244/118.1, 137.1

(56) References Cited

U.S. PATENT DOCUMENTS

| | | | | |
|---|---|---|---|---|
| 3,357,372 A | * | 12/1967 | Bader | 410/69 |
| 3,415,480 A | * | 12/1968 | Sertich | 410/77 |
| 4,231,695 A | * | 11/1980 | Weston, Sr. | 410/69 |
| 4,234,278 A | * | 11/1980 | Harshman et al. | 410/69 |
| 4,341,496 A | * | 7/1982 | Carpenter et al. | 410/79 |
| 4,349,302 A | * | 9/1982 | Ferguson, Jr. | 410/69 |
| 4,395,172 A | * | 7/1983 | Hoener et al. | 410/84 |
| 4,676,705 A | * | 6/1987 | Kuster et al. | 410/80 |
| 4,696,609 A | * | 9/1987 | Cole | 410/69 |
| 5,310,297 A | * | 5/1994 | Benjamin | 410/77 |
| 5,692,862 A | * | 12/1997 | Hilde | 410/69 |
| 5,865,579 A | * | 2/1999 | Thomas | 410/92 |
| 6,485,239 B2 | * | 11/2002 | Afful | 410/80 |

* cited by examiner

Primary Examiner—Stephen T. Gordon
(74) Attorney, Agent, or Firm—Joe Chalverus

(57) ABSTRACT

Methods for vertically restraining palletized cargo within an aircraft that quickly restrains and unrestrains vertical movement of transportation pallets of uneven shapes within a transportation bay employs a plurality of cams having upwardly oriented circular geared portion and downwardly oriented extended portion mounted onto the sides of the bay. Once a pallet is inserted into the bay with the outboard edges under cams urging the downwardly oriented extended portions to turn to accommodate distortions of the outboard edges, rotating the cams. Once the pallet is fully inserted into the bay, the methods employ locking levers with linear gears along the bottom mesh with the circular gears on portions of the cams preventing the cams from rotation. The extended portions of the cams with shock absorbing bumpers lie on the upper surface of the pallet restraining the vertical movement of the pallets. Alarm means to detect the status of the locking levers are also provided for.

3 Claims, 6 Drawing Sheets

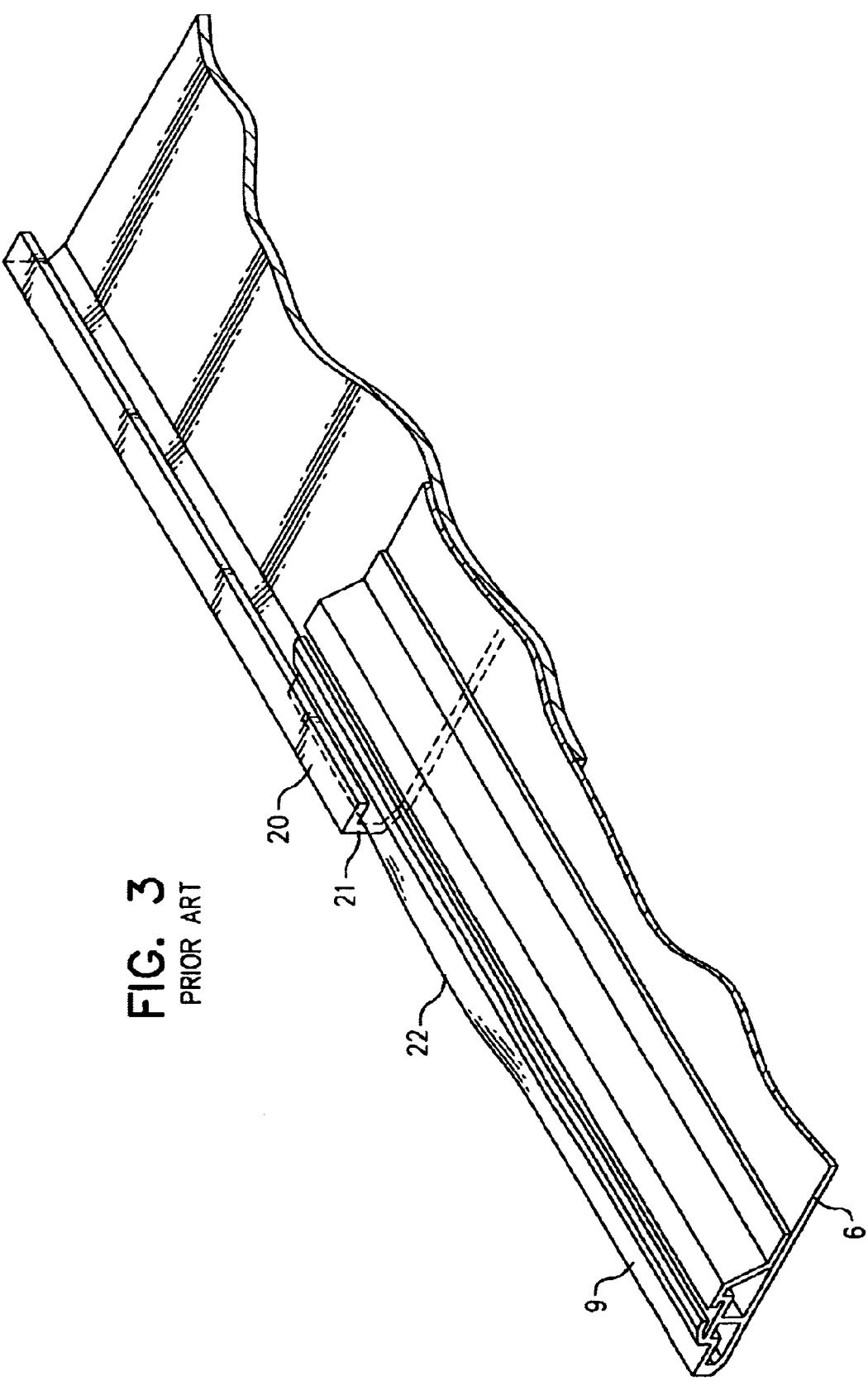

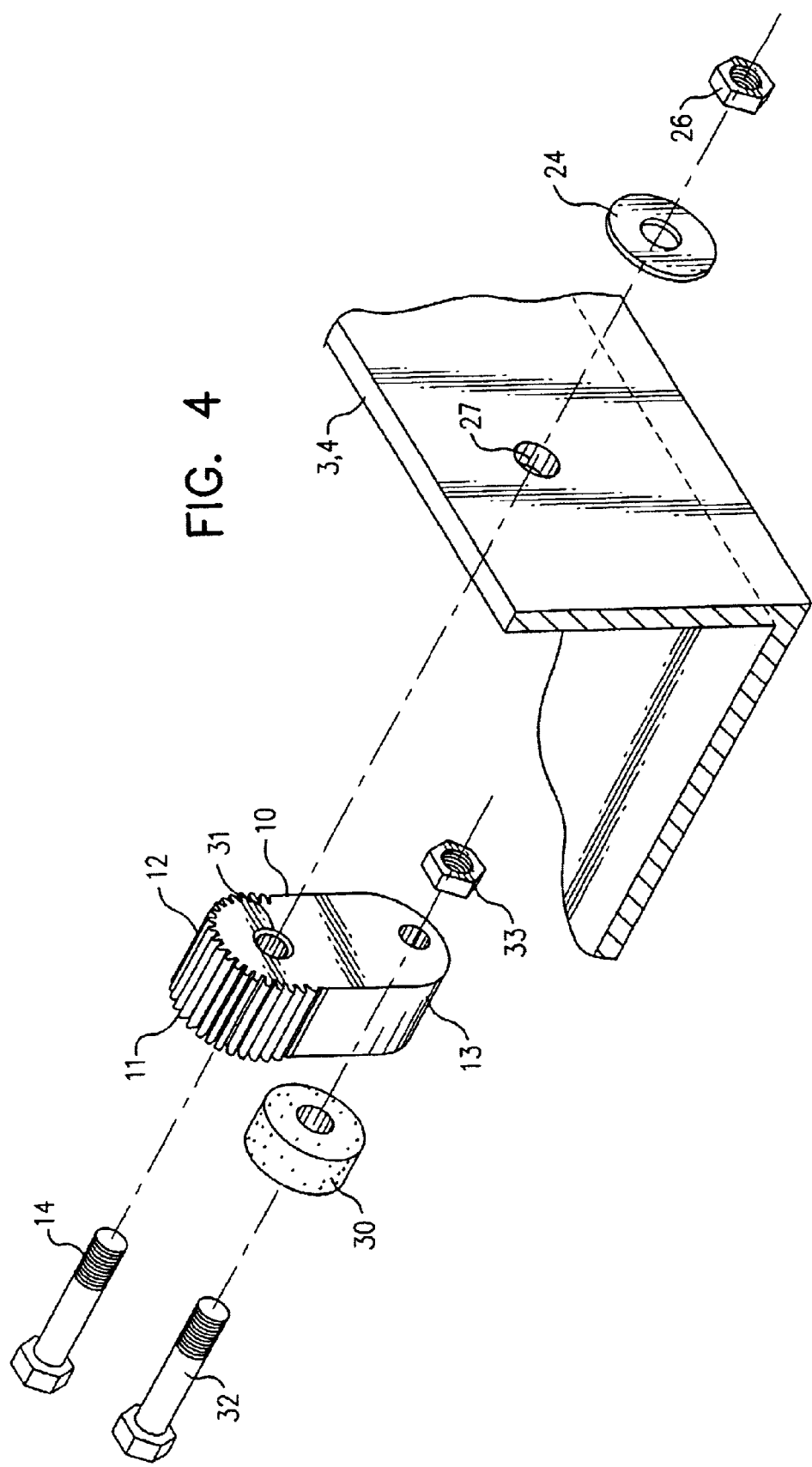

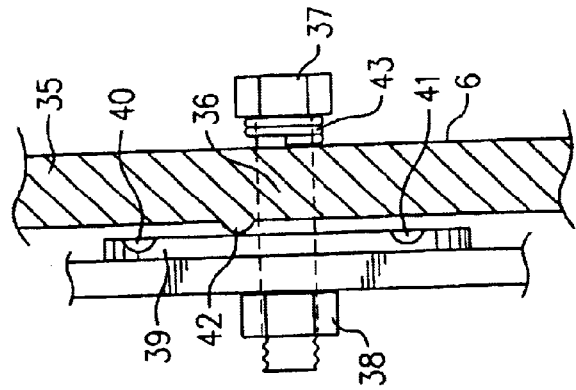
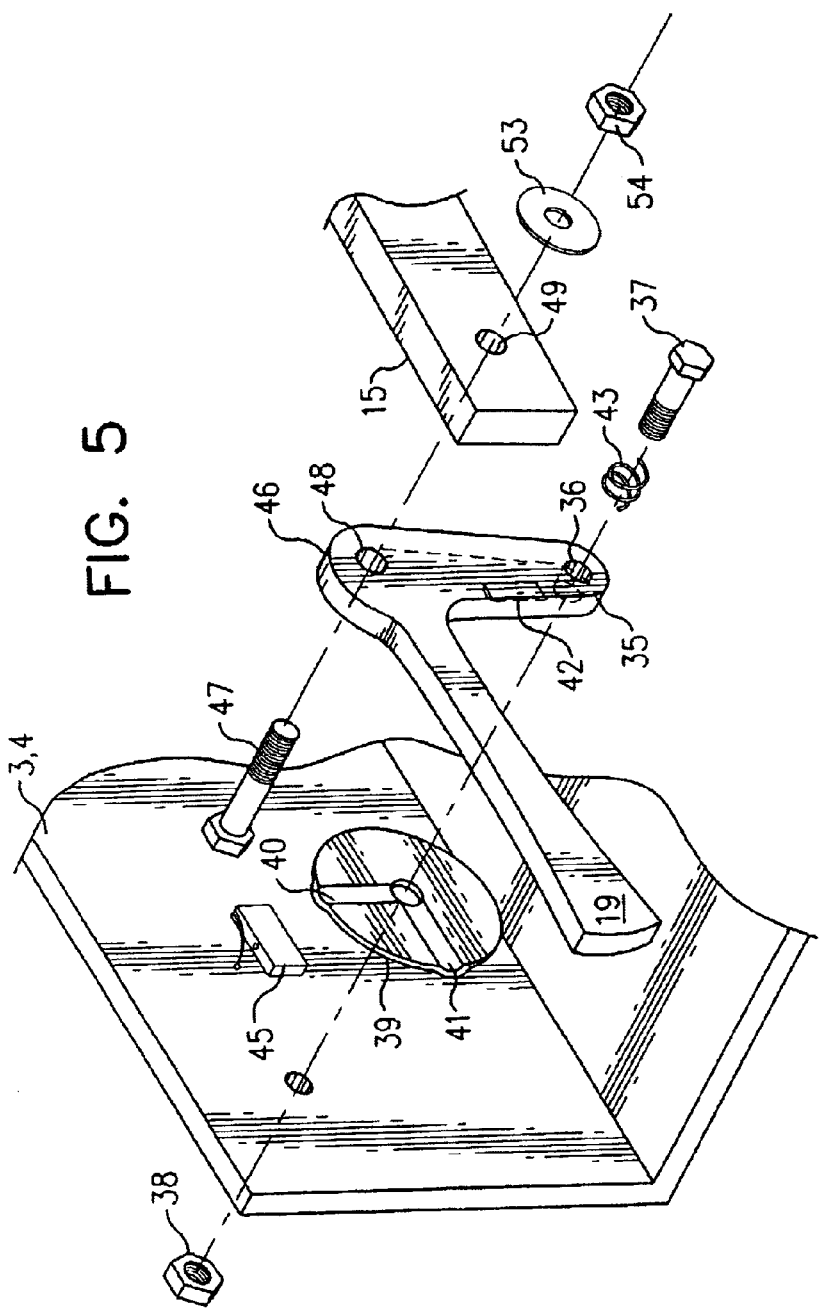

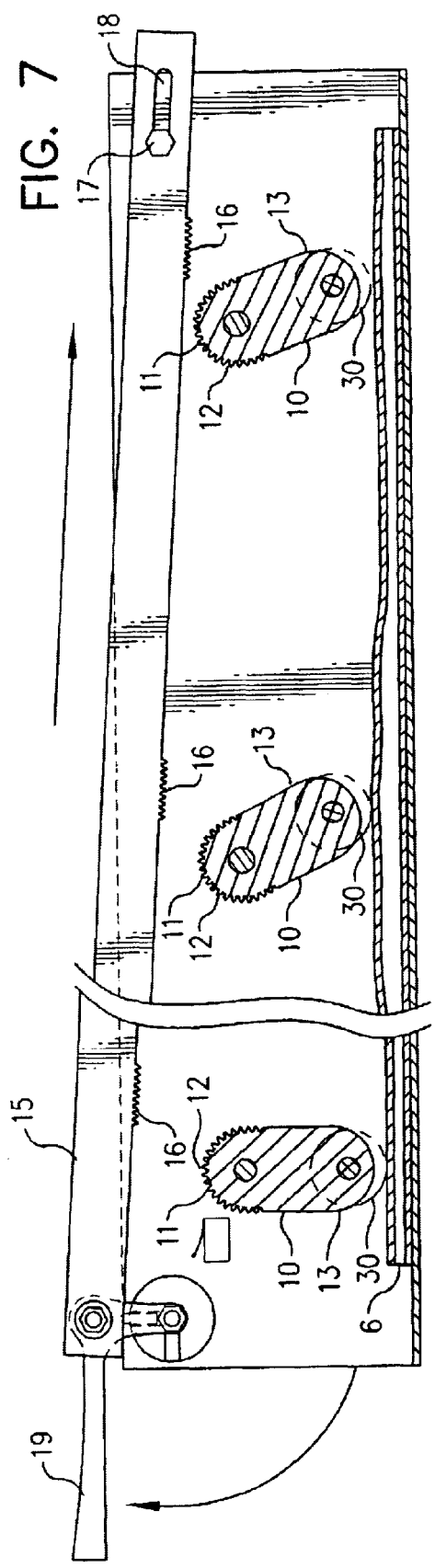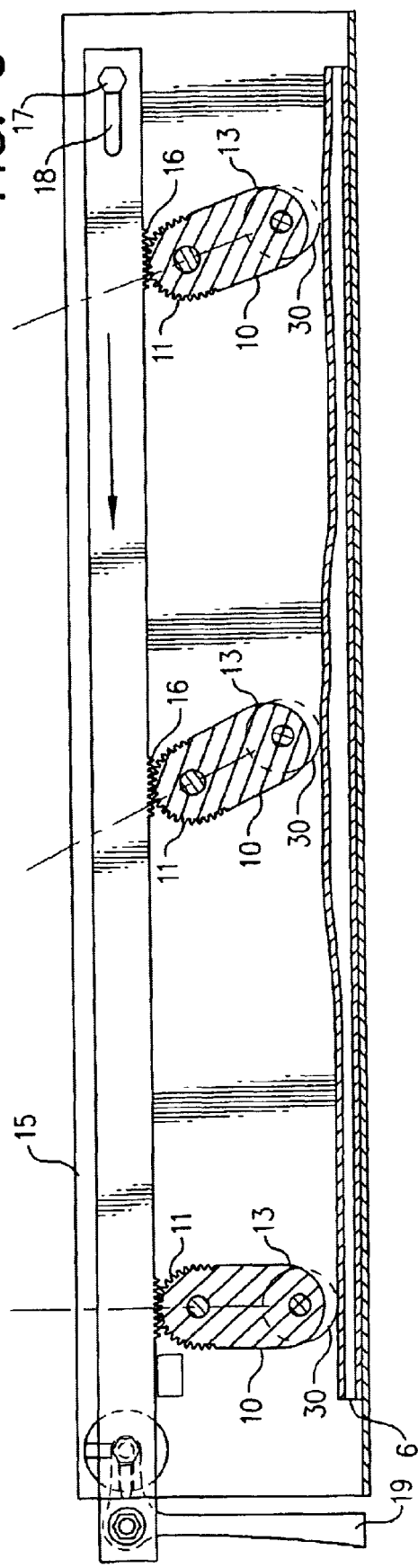

METHOD FOR VERTICALLY RESTRAINING AIRCARGO PALLETS WITHIN AN AIRCRAFT

PRIOR APPLICATIONS

This is a divisional application by the inventor of his U.S. patent application Ser. No. 09/737,694, filed on Dec. 18, 2000 under the title HOLD-DOWN DEVICE FOR AIRCRAGO PALLETS.

BACKGROUND OF THE INVENTION

1. Field of the Invention

For common aircraft carrying cargo, the cargo is usually palletized onto standardized flat pallets and standardized containers bases.

The present invention relates generally to systems to restrain cargo within airplanes and more specifically to methods for restraining cargo container pallets in place within the aircraft. With greater particularity, this invention relates to methods for vertically restraining cargo container pallets even when the cargo container pallets are defective or distorted. Cargo pallets and cargo containers used in the aircraft industry must conform to government issued standards and regulations. My invention, therefore also relates to the compliance of cargo pallet and cargo container to these regulations. Here, cargo pallet and cargo container are terms used herein interchangeably.

2. Prior Applications

This is a divisional patent by the inventor of his U.S. Ser. No. 09/737,694, filed Dec. 18, 2000, now U.S. Pat. 6,485,239 issued on Nov. 26, 2002 under the title: HOLD-DOWN DEVICE FOR AIRCARGO PALLETS.

3. Description of the Related Art

Governmental regulations and rules require cargo to be loaded and constrained in aircraft using regulated standard pallet and container bases in order to facilitate safety, cargo movement, handling, storage, and convenience. The container bases are sized to fit within designated area or cargo bays inside the aircraft according to size and weight distribution allowances and aircraft design.

Regulations and rules also require that the palletized bases be restrained in their bay from vertical, side and forward movements. Most existing containers used for interstate transportation must meet certification standards for load capacities and positive side vertical restrains. For this purpose, a standard pallet base has hold-down areas or strips extending horizontally from the outboard edges and sides at the bottom of the base with strap slots used for restraining purposes. Vertically restraining the upward motion of the pallets at these side edges is important, since the reaction loads of locked pallets must distribute the forces within the adjacent floor beams of the aircraft. Existing pallets and containers without side vertical restraints are restrained for vertical up-gust loads only by the end latches. This configuration transfers vertical up-gust loads on the closest floor beams at the ends of the pallets and containers which under some circumstances, can exceed maximum tolerances leading to failure. Moreover, existing pallets and containers without side vertical restrains are restrained for vertical couple arising from forward-aft loads only by the end latches. Hence, all vertical kick loads in crash conditions are transferred through the end latches to the closest floor beams, leading in most cases to over-loading and failure. It is therefore necessary to have a bulkhead or barrier with sufficient strength to restrain the cargo in a crash condition in the present art.

On each bay, horizontal lipped slots on near the base of the bay provide vertical restrain means. These receive standard outboard edges of the pallet to constrain upward pallet movement within the bay. These lipped slots presume the size and shape of the pallet outboard edges to be straight within the tolerance specified as a receiving gap for the pallet. Both the side lipped slots and pallet outboard edges must be within 0.25 of an inch to ensure positive vertical contact necessary to restrain the pallet and to enable the outboard edges to slide within the lipped slots as the pallet is secured. If the outboard edges of the pallet become distorted or broken from use or wear, the pallet will not slide into the lipped slots easily and the pallet may not be correctly placed within the cargo bay. When this happens, the cargo must be reloaded onto a new pallet, the defective pallet is either discarded or the distortion is corrected. This of course becomes impractical at times. Other solutions to secure a pallet with deformed outboard edges, whether approved or not includes removal of the distorted portions of the outward edges by cutting until the horizonal edges of the pallet fit within the lipped slots. Cutting or correction of the distorted areas weakens the pallet and threatens the security of the cargo within the aircraft.

Accordingly, a need exists for an easy, quick and assured means to constrain cargo and container pallets within cargo bays that allows for and adjusts to distorted outboard edges, while safely restraining vertical movement of the pallet within the bay.

More specifically, a means has been sought to find a cargo pallet hold down system having few moving parts, that will adapt to the various deformations of pallets but will lock the pallet to the aircraft bay. Ideally, the system is as strong as needed to constrain fully loaded pallets or containers yet be able to quickly engage and unengaged pallets within bays to facilitate fast loading and off-loading. The system should be adaptable to existing cargo bays to reduce costs of implementation and ease of use as well as function perfectly with normal pallets as well.

Certain other performance requirements are beneficial to an ideal pallet hold-down systems: they should be constructed with few parts of commonly available materials and the operation should be easy to understand and tolerate misuse.

BRIEF SUMMARY OF THE INVENTION

My system is designed to be installed at existing cargo bays with a minimum of modification of existing bays. Two side frames or walls are mounted along the two sides of the cargo bays to replace the lipped slots. The walls are sized and permanently secured to the bay as described below. Normal load carrying rollers to facilitate pallet movement within the cargo areas may be left under the bay. My system uses specially designed cams which are attached to the inside walls of the frames instead of the lipped slots. The cams are circular on the top or upper portion but have an extended or tongue shaped elongated portion on the lower portion of the cam. A shock absorbing, bumper attached to the lower portion of the cam engages the upper surface of the pallet to eliminate metal to metal contact and noise. The cams are attached to the inside of the walls above the entrance way of the pallet. In the unlocked position each cam with bumper is free to rotate. As a pallet is moved into the bay, the bumpers are urged by the pallet to ride on the outboard edges of the pallet, rotating the cams according to the dimensions and distortions of the edges. After the pallet is safely located within the bay, a locking lever on each side of the bay is rotated to lock the cams with bumpers to the outboard edges of the pallet. This is done by using linear gears or teeth fixed to the underside or bottom of each locking lever which when closed engage similarly contoured gears or teeth configured along the top circular portion of cams. When the locking lever is closed, the teeth engage preventing the cams from rotation and the tongues or elongated portions of the cams with bumpers are thus locked to the upper surface of the outboard edges of the pallet preventing vertical movements of the pallet. With this invention, the distortions and uneven thickness of the outboard edges of the pallet are accommodated by the degree of rotation of the cams. The bumpers absorb any shocks and mechanical impacts of metal to metal. A microswitch in conjunction with the locking means provides a status indicating means for the crew, should there be a question as to whether the hold-down device is in the locked or unlocked position.

Accordingly, it is a general object of the present invention to provide an improved cargo pallet retaining means.

More specifically, it is an object of the present invention to provide a palletized cargo or container vertical restraining means that conforms to a pallet even when the outboard edges of the pallet are distorted.

It is also an object to provide the method for using an improved hold down device for an aircargo pallet that is simple to operate and easy to use.

It is a further object of my invention to provide an improved hold down device that includes a means to determine whether the hold down device is in a locked or unlocked position.

It is another object of the present invention to attain the foregoing objects and also to provide an improved pallet hold down device that is strong, easy to understand and adaptable in environments where loading and off loading must be done within short time periods.

Because containers and pallets used in interstate commerce are government certified for maximum load capacities with mandatory positive side vertical restrains, my invention ensures that these vertical restrains are met.

My invention also ensures that load capacities and positive side vertical restraints certifications are met as well.

My invention also provides for better distribution of up-gust loads to other floor beams within a cargo bay to relieve excessive loading of the end beams and increased pallet and container loads within the aircraft.

My invention additionally, ensures distribution of kick loads to other floor beams within the bay to reduce loading of the end latches and floor beams, reducing the need in most cases of a crash bulkhead or barrier fore of the cargo.

Further objects and advantages of my invention will become apparent from a consideration of the drawings and ensuing description thereof.

BRIEF DESCRIPTION OF THE DRAWING

FIG. 3. illustrates a partial perspective view of a typical cargo-bay with distorted outboard edges of a pallet, partially shown, labeled PRIOR ART.

FIG. 4. illustrates idealized mounting details of the off-centered cams to the side of the hold-down device for aircargo pallets, for both walls of the bay.

FIG. 5. illustrates a partial exploded view of the assembly of a locking handle.

FIG. 6 is an exploded side view of the locking handle with detente means.

FIG. 7. illustrates a side view of the hold-down device with distorted pallet in the unlocked configuration.

FIG. 8. illustrates a side view of the hold-down device with a distorted pallet in the locked configuration.

DESCRIPTION OF THE PREFERRED EMBODIMENTS

Figure 1:
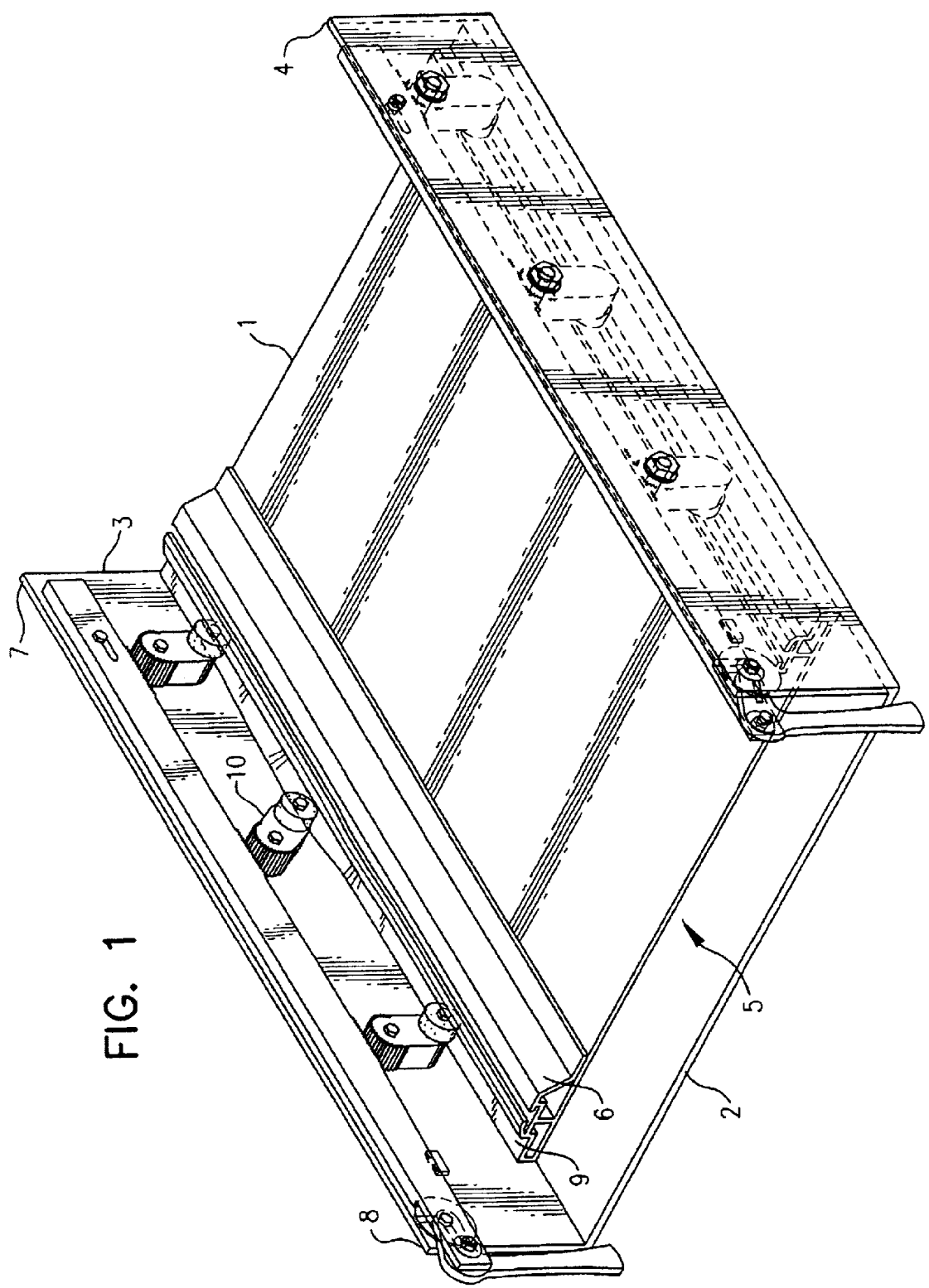
FIG. 1. illustrates a perspective view of the hold-down device for aircargo pallets according to this invention in the closed position over a distorted pallet.

With view of FIG. 1, my hold-down device for aircargo pallets shown generally as 1 has a base 2 and two sides 3 and 4 to define a bay 5. Both sides 3,4 are similarly constructed. The sides and base are permanently attached to the aircraft according to specifications of the aircraft design. In the industry, pallet rollers under the bays and within an aircraft (not shown) facilitate the movement of cargo pallets within the aircraft and into bays. These rollers and bay frames are not shown here since those details would distract from the features of my invention. The bay 5 is sized to receive a pallet 6 within the side walls 3 and 4 over the base 2.

As can be seen in FIG. 3, present pallet restraining systems using vertical restraining lipped slots 21 longitudinally aligned along bay sides 20 are sized to receive properly sized outboard edges 9 on pallets. Distortions of the outboard edges 9 above tolerance may prevent the pallet from fully fitting within the bay 5 due to fixed size lipped slots 21. For example, in FIG. 3, a pallet 6 may have an distortion in area 22 on the outboard edge 9 where the magnitude of the distortion exceeds the opening of the lipped slot 21. In these cases, the pallet will not properly fit within the bay 5 until the cargo pallet 6 is replaced with one having less outboard edge distortion or to correct or remove the deformation area 22 of the outboard edge 9. These solutions are costly and time consuming.

Figure 2:
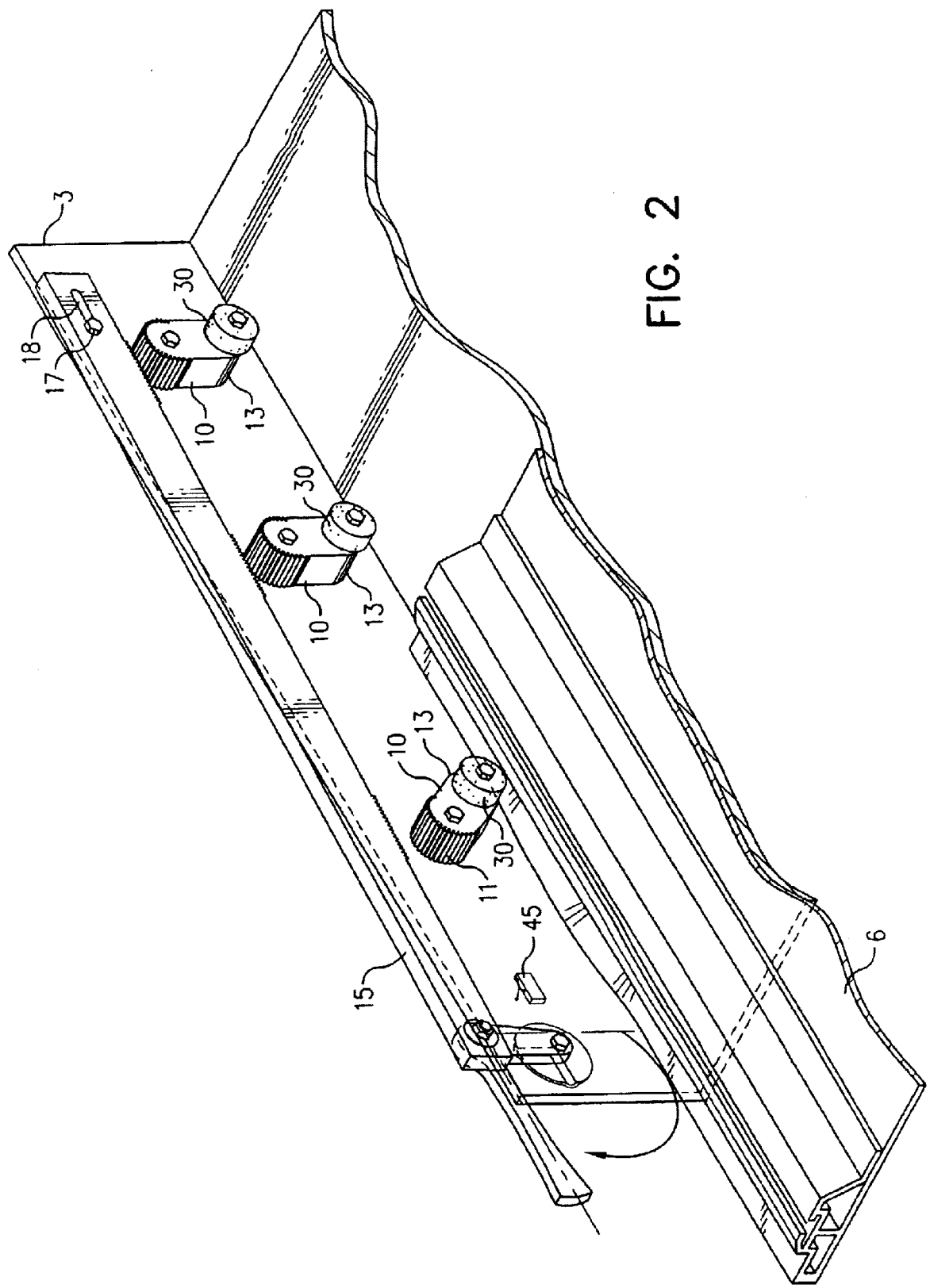
FIG. 2. illustrates a partial perspective view of the hold-down device for aircargo pallets in the open position while receiving a distorted pallet.

Instead of lips on the bay sides 21, with FIGS. 2 and 4 at hand, it can be seen that my invention uses a plurality of cams 10 mounted to the sides 3,4 at intervals directed interiorly of bay 5 as shown in FIG. 2. Each cam 10 has an upper circular portion 12 and a downward oriented elongated portion or tongue 13 of the cam 10. The upper portion of the cam 12 is circular with gears 11 along this portion 12, for reasons that will be explained below. A tire shaped shock absorbing bumper 30 can be attached near the end of the elongated portion of each cam 13. These bumpers 30 can be mounted on the cam to extend beyond the tongue 13 to rotate above the pallet as the pallet is introduced into the bay 5 according to the variations in size of the pallet. Each cam 10 is mounted to the walls 3 and 4 in a manner that permits the cam 10 to rotate around a pivot point 31 of the cam which is the center of the circle defined by the upper circular portion of the cam 10. As the cam 10 rotates about the pivot point 31 the upper circular upper portion 12 acts as a set of gears 11 while the downward extended portion of the cam 10, with bumper 30 moves up and down to allow varying clearance to the bottom of the base 2. FIG. 4 shows that the cam 10 is attached to the sides of the bay using a threaded pin 14 through a mounting hole 27, washer 24 and cam hold-down nut 26 mounted through the pivot point 31 to the walls 3,4. The cam 10 may also be secured to the side 3,4 in any other way that will permit the cam 10 to freely rotate about pin 14, with or without roller bearings (not shown) to minimize friction.

When used, the bumpers 30 extend beyond the end of the elongated portion of the cam 13 and rotate about pin 32, held in place by nut 33. The bumpers 30 eliminate metal of the pallets to the metal of the cams noise. These bumpers 30 could also be assisted by roller bearings (not shown) to minimize friction with the races being centered around the pin 32.

It is important that the top portion of the cam 10 be circular so that as the pallet 6 is inserted or withdrawn, the geared portion 11 of the cam 10 rotates circularly about the pivot point 31 at pin 14. In this way, as the extended portion of the cam 12 moves to accommodate the various dimensions of the outboard edges 9 of the pallet, the cam 10 rotates the locking surface indentations 11, in a gear-like rotation.

To load, a pallet 6 is moved into the bay 5, the outboard edges 9 positioned under the bumpers 30. As the pallet is introduced into the bay the outboard edges 9 will urge the cams 10 to rotate, the upper portion of the cam 12 acting as a gear.

FIG. 1 demonstrates the rotation of the cam 10 in response to pallet distortions. One cam 10 is rotated with respect to the other cams 10, as shown by the angular orientation of the extended portion 12 with respect to the other cams. Obviously, cam 10 is mounted in the same manner as the other cams but the upward distortions of the outboard edges rotated the cam 10 to accommodate the distortions of the outboard edges of the pallet.

While viewing FIG. 6, shows only one locking lever 15 it should be understood that my invention contemplates two levers, one on each side of the bay extending from the far end of the bay 7 to the near end of the bay 8 as portrayed in FIG. 1 but both levers operate in the same manner. After the pallet 6 is fully inserted in the bay 5, the locking lever 15 is closed to lock cams 10 from further rotation by the interaction of the linear gears 16 with the gears 11 on the upper surface of the cams 10, seen in FIG. 7. Locking lever 15 is rotatively attached to the far end 7 of the bay by pin 17 held by slot 18. The pin in slot arrangement permits the lever 15 to move between the unlocked position shown in FIG. 7 and the locked position shown in FIG. 8 when the handle 19 is rotated.

A locking handle 19 for each lever is located at the near end of the bay 8. The handle 19 is mounted to the interior side of the side walls 3,4 using end threaded pin 37 at hole 36 at the extension portion 35 of the handle 19 and nut 38. The handle 19 is allowed to raise from the wall against the urging of the locking spring 43. A detente ring 39 is attached to the interior wall of 3,4. The ring 39 has two radially located locking dents 40 and 41 to engage locking dimple 42 located at the interior side of the extension 35 on the handle 19. As the handle is rotated, the dimple 42 moves from one locking dent 40, 41 against the urging of the locking spring 43 to the other locking dent 40,41 and retained therein with the urging of the locking spring 43. While there are many ways that are obvious to determine whether the handle 19 is in the locked position, a simple method would be to mount a microswitch 45 near the lever 15 so that when the handle 19 is in the fully locked position, the lever 15 engages the microswitch. This permits an alarm system to be wired to the microswitch 45 so that alarms could sound or lights could flash if a handle happens to be in the unlocked position or provide for an indicator means when all the handles are in the locked position. These microswitches are available to be suitably wired with alarm circuitry using technology that is well known in the industry. The alarms could be close and associated to each bay so that the cargo handlers could independently verify that the cargo pallets are properly locked into place and also wired with known technology to advise the pilot of the condition of the locking device for each bay.

The pivot portion 46 of the handle 19 is attached to the near end of the locking lever 15 with threaded pin 47 mounted through hole 48 on the handle 19 and through hole 49 on the near end of the locking lever 15. The pin 47 is locked with washer 53 and nut 54 to permit the handle 19 to rotate about the pin 47 when it is moved between the locking and unlocking positions as shown in FIGS. 6 and 7.

When the handle 19 is rotated into a closed position, as shown in FIG. 7 the linear gears or teeth 16 on the bottom surface of the locking member 15 engage the upward gears or teeth 11 along the upper circular portion 12 of the cams 10. This prevents the cams 10 from rotating. The gears 16 are attached to the under side of locking member 15 in any conventional manner where they would engage the cams 10. Once the cams 10 are locked, vertical forces of the pallet are first translated directly to rotation forces of the cams 10 and not as forces to open the locking member 15. Accordingly, the means to latch the locking member 15 to the sides need not be more than necessary to maintain the member 15 fixed to side 3,4 with the gears 16 engaged to the gears on 11.

While the above description contains many specifications, these should not be construed as limitations to the scope of my invention, but rather as an exemplification of one preferred embodiment thereof. Many other variations are possible while within the concept of my invention. Accordingly, the scope of my invention should be determined not by the embodiment illustrated, but by the appended claims and their legal equivalents.

What is claimed is:

1. The method of vertically restraining cargo pallets having outboard edges within a transportation bay comprising the steps of:

inserting one of said cargo, pallets within a pair of parallel side walls of the transportation bay under a plurality of cams, each cam having a downward elongated portion and an upper circular portion with gear means, the cams attached at regular intervals to an interior side of said walls at the center of the circle defined by the circular portion to pivot, the outboard edges urging the elongated portion of each cam to raise and rotate the upper circular portion of said cams;

removably positioning locking members along an upper portion of the walls having bottom facing linear gears so that said linear gears engage said gear means, constraining the elongated portion of each cam to the upper surface of the outboard edges when in a locked condition.

2. The method of vertically restraining cargo pallets having outboard edges within a transportation bay as described in claim 1 further comprising the steps of impressing said locking members to an alarm indicator means whenever said locking members are positioned so that the bottom facing linear gears are fully engaged with said gear means.

3. The method of vertically restraining cargo pallets as described in claim 2 wherein each cam has a shock absorbing means.

\* \* \* \* \*